US 6,674,189 B2

(12) United States Patent
Watanabe et al.

(10) Patent No.: US 6,674,189 B2
(45) Date of Patent: Jan. 6, 2004

(54) SPINDLE APPARATUS

(75) Inventors: Akira Watanabe, Ritto (JP); Tetsuo Ichikizaki, Hiroshima (JP); Keiji Mizuta, Hiroshima (JP); Kenji Hamanaka, Ritto (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/230,272

(22) Filed: Aug. 29, 2002

(65) Prior Publication Data

US 2003/0094864 A1 May 22, 2003

(30) Foreign Application Priority Data

Nov. 16, 2001 (JP) ........................................ 2001-351159

(51) Int. Cl.⁷ ................................................ H02K 9/00
(52) U.S. Cl. ......................... 310/52; 310/52; 310/54.5; 310/56
(58) Field of Search ............................. 310/52, 54, 55, 310/56

(56) References Cited

U.S. PATENT DOCUMENTS

| 4,223,239 A | 9/1980 | Eckels | 310/52 |
| 4,239,999 A | 12/1980 | Vinokurov | 310/52 |
| 5,030,863 A | 7/1991 | Yoshimura et al. | 310/52 |

FOREIGN PATENT DOCUMENTS

| JP | 2000-155441 A | 1/2000 | H02K/9/00 |
| JP | 2000-52188 A | 2/2000 | |

Primary Examiner—Karl Tamai
Assistant Examiner—Iraj A. Mohandesi
(74) Attorney, Agent, or Firm—Birch, Stewart, Kolasch & Birch, LLP

(57) ABSTRACT

A spindle apparatus of a machine tool comprises a main spindle rotatably supported in a housing via bearings. A helium circulation system is provided for introducing helium, lower in density and fluid pressure than air, through a helium supply port into a gap on the outer periphery of the main spindle within the housing, and for discharging helium to the outside through a helium discharge port. The main spindle is rotated in an atmosphere of the helium. The spindle apparatus is simple in structure, but can minimize the power loss of the main spindle and reduce the motor power, and also gives a cooling effect.

11 Claims, 2 Drawing Sheets

SPINDLE APPARATUS

The entire disclosure of Japanese Patent Application No. 2001-351159 filed on Nov. 16, 2001 including specification, claims, drawings and summary is incorporated herein by reference in its entirety.

BACKGROUND OF THE INVENTION

1. Field of the Invention

This invention relates to a spindle apparatus of a machine tool, such as a machining center.

2. Description of Related Art

A built-in motor type spindle apparatus, in which a rotor of a motor is mounted on a main spindle, a stator of the motor is mounted on an inner peripheral portion of a spindle case, and the motor is built into the spindle case, is well known as a spindle apparatus of a machine tool, such as a machining center.

For such a built-in motor type spindle apparatus, various cooling mechanisms have so far been proposed in order to avoid the heat deformation of the main spindle due to a temperature rise caused by heat generation of the built-in motor (spindle motor), in addition to conduction and radiation of the rolling frictional heat of bearings.

For example, Japanese Unexamined Patent Publication No. 2000-15541 discloses a spindle apparatus in which a continuous helical groove is provided on an axial outer peripheral surface of a main spindle from a front portion to a rear portion thereof, and a cooling liquid is circulated through the helical groove and brought into contact with inner rings of a front bearing and a rear bearing and the interior of a rotor of a spindle drive motor to cool the inner rings and the rotor directly and also cool the main spindle itself.

Japanese Unexamined Patent Publication No. 2000-52188 discloses a built-in motor type spindle apparatus in which a ring-shaped heat radiation fin member rotating integrally with a main spindle of the spindle apparatus is mounted on the main spindle, and a cooling air passage for blowing cooling air against the heat radiation fin member is formed in a spindle case.

However, the former spindle apparatus requires a measure for preventing leakage of the cooling liquid, making the apparatus complicated and inducing a cost increase. With the latter spindle apparatus, cooling air is relatively higher in density and higher in fluid resistance than other gases, thus causing a considerable power loss to the main spindle as a rotating part and requiring a great motor power.

SUMMARY OF THE INVENTION

The present invention has been proposed in light of the above-mentioned problems with the conventional spindle apparatuses. Its object is to provide a spindle apparatus having a simple structure which minimizes a power loss of a main spindle, can decrease a motor power, and produces a cooling effect.

According to the present invention, designed to attain the above object, there is provided a spindle apparatus of a machine tool, comprising a main spindle rotatably supported in a housing via bearings, and wherein means for circulating a gas lower in density and fluid pressure than air is provided in the housing, and the main spindle is rotated in an atmosphere of the circulating gas. Thus, the power loss of the main spindle can be minimized, the motor power can be decreased, and a cooling effect is obtained. Furthermore, some leakage of the circulating gas can be allowed, so that the sealing structure can be simplified.

In the spindle apparatus, a sealing gas may be supplied to a gap between the housing and the main spindle to isolate an interior of the housing from an outside. In this case, the circulating gas, which has been supplied to the gap on the outer periphery of the main spindle (within the housing), can be prevented from leaking to the outside through the gap between the housing and the main spindle. Besides, a coolant or swarf can be prevented from entering the gap on the outer periphery of the main spindle from the outside through the gap between the housing and the main spindle.

In the spindle apparatus, a sealing gas separator for separating and discharging the sealing gas may be interposed in a circulation system for the circulating gas. In this case, a sufficient amount of the circulating gas is always circulated in the gap on the outer periphery of the main spindle (within the housing).

In the spindle apparatus, the circulating gas may be helium. In this case, advantages over the conventional apparatus in terms of cost and safety are obtained, in addition to the aforementioned effects.

In the spindle apparatus, a rotor of a motor may be mounted on the main spindle, a stator of the motor may be mounted on an inner peripheral portion of the housing, and the motor for the main spindle may be built into the housing. In this case, a temperature rise in the main spindle due to heat generation of the so-called built-in motor can be effectively suppressed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

A spindle apparatus according to the present invention will now be described in detail by an embodiment with reference to the accompanying drawings, which in no way limit the invention.

Embodiment

Figure 1:
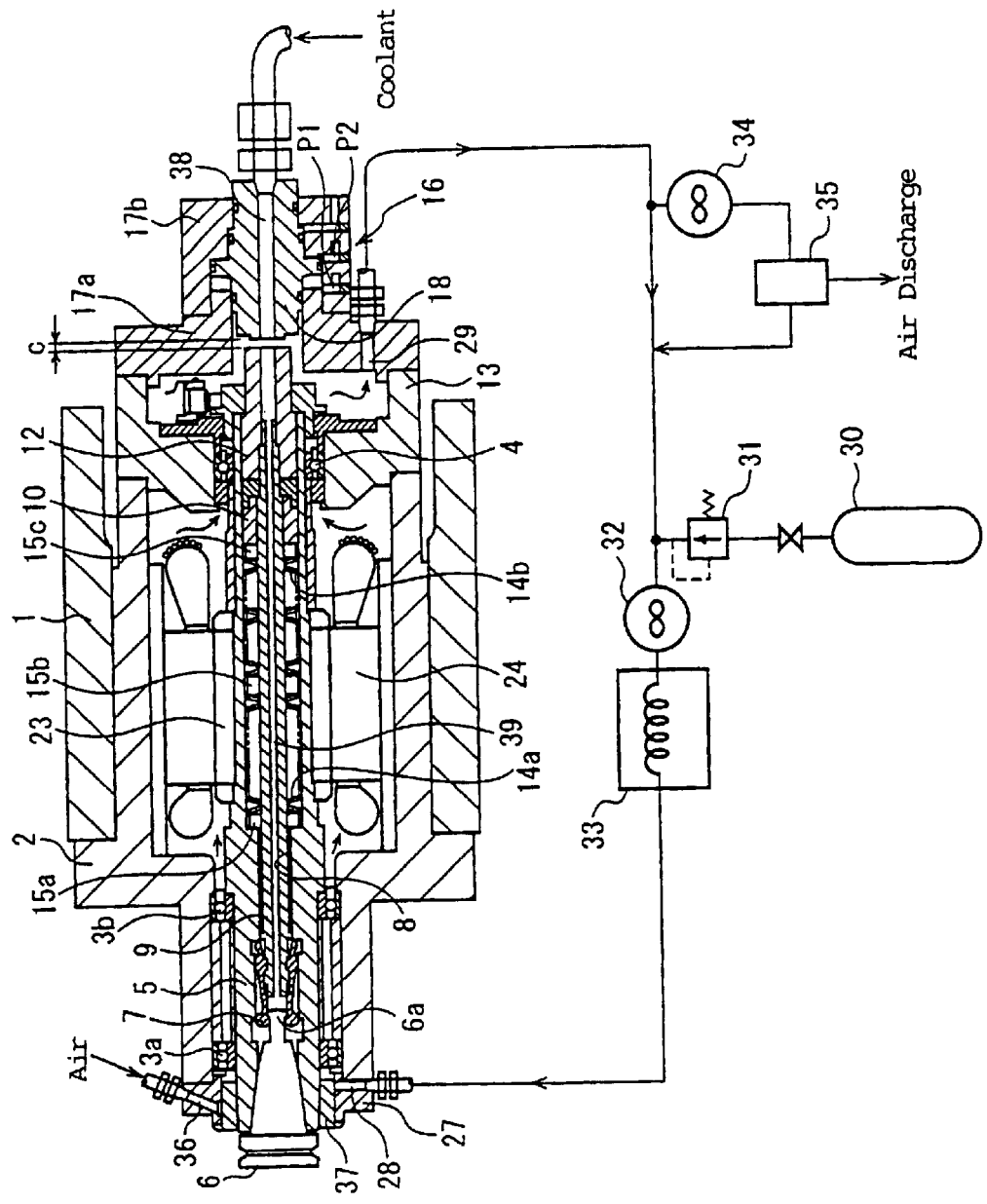
FIG. 1 is a longitudinal sectional view of a built-in motor type spindle apparatus according to an embodiment of the present invention.
Figure 2:
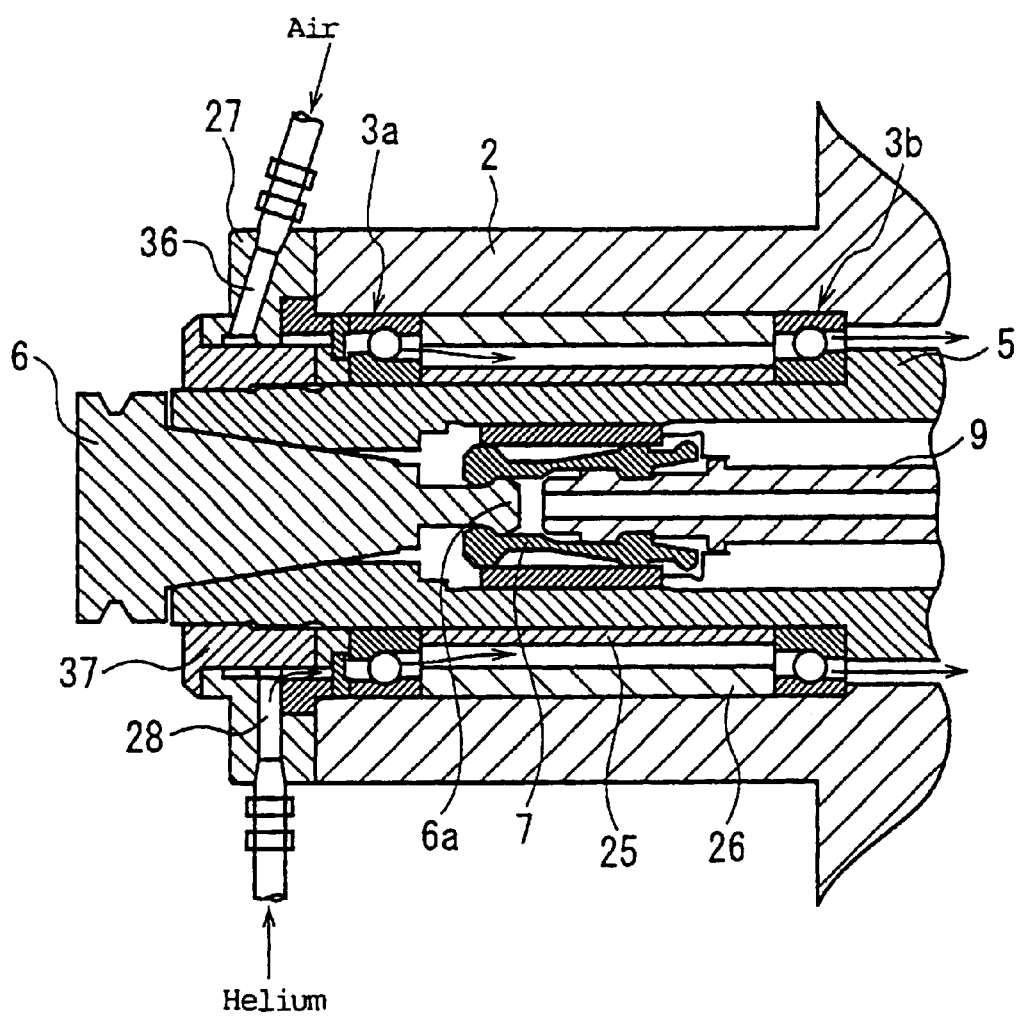
FIG. 2 is an enlarged sectional view of the essential part of the built-in motor type spindle apparatus.

FIG. 1 is a longitudinal sectional view of a built-in motor type spindle apparatus according to an embodiment of the present invention. FIG. 2 is an enlarged sectional view of the essential part of the built-in motor type spindle apparatus.

A spindle head 1 is movable in a right-and-left direction in the drawing on an arm (not shown) of a machining center equipped with an ATC (automatic tool changer), and a housing (case) 2 is fastened to the spindle head 1, with a right half of the housing 2 being accommodated in the spindle head 1, as shown in FIG. 1.

Within the housing 2, a main spindle 5 is rotatably accommodated and held via front and rear anterior bearings 3a and 3b as a pair, and a posterior bearing 4. A tool holder 6, having a pull stud 6a, is adapted to be retracted into a front end portion of the main spindle 5 by a draw bar 9 (to be described later) so as to be rotatable integrally with the main spindle 5.

In detail, the draw bar 9 is inserted through a central through-hole 8 of the main spindle 5, and the draw bar 9 is screwed to a nut 10 longitudinally slidable in the central through-hole 8, whereby the draw bar 9 is held centered such that its central axis coincides with the central axis of the main spindle 5. A joint 12, longitudinally moving integrally with the draw bar 9, is screwed behind the nut 10.

The draw bar 9 retracts the pull stud 6a of the tool holder 6 by means of a collet chuck 7 assembled to a front end portion of the draw bar 9. By so doing, the tool holder 6, which has held a tool (not shown), is fixed (clamped) integrally with the main spindle 5 via the collet chuck 7.

Front and rear helical compression springs 14a and 14b as a par, which are spirally wound leftward and rightward, respectively, are wound round an intermediate outer periphery of the draw bar 9 via three tubular spacers 15a, 15b and 15c to urge the draw bar 9 always in a retracting direction. Many ordinary coned disc springs may be used instead of the helical compression springs 14a and 14b.

To release clamping of (unclamp) the tool holder 6, a hydraulic cylinder 16 provided behind the main spindle 5 is used. The hydraulic cylinder 16 comprises a piston 18 slidably mounted and housed in head portions 17a and 17b integrally assembled to a rear portion of the housing 2 via an intermediate member 13.

Upon stroke of the piston 18 in an extending direction (from the rear end toward the front end of the main spindle 5) by a pressure oil from an oil pressure supply source (not shown), which is supplied to and discharged from ports P1, P2, a front end portion of the piston 18 contacts a rod end of the draw bar 9 (strictly, the rear end surface of the joint 12) to move the draw bar 9 forward (push it outward) against the urging force of the helical compression springs 14a and 14b. As a result, the collet chuck 7 assembled to the front end of the draw bar 9 makes a release motion to unclamp the tool holder 6.

Upon stroke of the piston 18 in a contracting direction (from the front end toward the rear end of the math spindle 5), with the tool holder 6 being inserted into the front end of the main spindle 5, a rearward movement (retraction) of the draw bar 9 brings the collet chuck 7 into engagement with the pull stud 6a to clamp the tool holder 6.

A motor is built into the present spindle apparatus in order to rotate the main spindle 5. That is, a rotor 23 is fixed to the outer periphery at a suitable position of the main spindle 5, and a stator 24 is fixed to the inner periphery of the housing 2 in opposed relationship with the rotor 23 to form a so-called built-in motor.

In the present embodiment, as shown in FIG. 2, angular bearings in rear surface alignment are used as the anterior bearings 3a and 3b to bear most of the mounting stiffness of the main spindle 5. Thus, a roller bearing is used as the posterior bearing 4 (see FIG. 1). An inner ring spacer 25 and an outer ring spacer 26 are interposed between the anterior bearings 3a and 3b.

In the present embodiment, moreover, a helium supply port (supply passage) 28 is formed in a front end cap 27, and a helium discharge port (discharge passage) 29 is formed in the head portion 17a.

Helium (circulating gas) within a compressed gas cylinder 30 is adjusted to a predetermined pressure (air pressure>helium pressure) by a pressure regulating valve 31, then pressure fed by a blower 32 to a heat exchanger 33, where it is cooled, and then supplied to the helium supply port 28.

Helium discharged from the helium discharge port 29 (helium which contains air as a sealing gas to be described later) is returned to the blower 32. If desired, it is pressure fed to a helium separator 35 by a pump 34. In the helium separator 35, air is separated from the helium by liquefaction using a refrigerator, and discharged. The separated helium is returned to the blower 32.

The helium, supplied to the helium supply port 28, passes through a gap on the outer periphery of the main spindle, arrives at the helium discharge port 29, and then circulates. In detail, helium flows over the route: helium supply port 28→interior of anterior bearing 3a→gap between inner ring spacer 25 and outer ring spacer 26→interior of anterior bearing 3b→interior of housing 2→interior of posterior bearing 4→space between intermediate member 13 and head portion 17a→helium discharge port 29.

An air supply port (supply passage) 36, which is supplied with air, as the aforementioned sealing gas, from a pressurized air supply source (not shown), is formed in the front end cap 27 to air-seal a gap between the front end cap 27 and a bearing hold-down 37. That is, the sealing air prevents helium, which has been supplied to the gap on the outer periphery of the main spindle, from leaking to the outside through the above-mentioned gap, and also prevents a coolant or swarf from entering the gap on the outer periphery of the main spindle from the outside through the above-mentioned gap.

A coolant supply port (supply passage) 38, which is supplied with a coolant (cooling medium) from a supply source (not shown), is formed in the piston 18. When an initial clearance C between the piston 18 and the joint 12 is closed, the coolant is supplied to a point of machining of a workpiece (not shown) through an inner passage 39 of the draw bar 9 and the interior of the tool holder 6.

According to the above-described features, the draw bar 9 is retracted toward the rear end of the main spindle 5 to clamp the tool holder 6, and the initial clearance C is closed with a slight extending motion of the piston 18 (a motion not so great as to unclamp the tool holder 6). In this state, the main spindle 5 is rotated by the so-called built-in motor comprising the rotor 23 and the stator 24 to machine the workpiece (not shown).

At this time, the main spindle 5 is rotated within the housing 2 in a gas atmosphere of helium supplied to the gap on the outer periphery of the main spindle. This helium has a lower density and a lower fluid resistance than air, so that the power loss W of the main spindle 5 as a rotating part is decreased, and the required motor power is reduced. Consequently, high speed rotation of the main spindle 5 is realized. Particularly with rotation at a peripheral speed of the outer periphery of the motor rotor exceeding the sound velocity in air (about 340 m/s), shock waves occur, with the result that the motor power consumed for agitation of air increases sharply, and vibration and noise increase. On the other hand, the sound velocity in helium is higher than that in air (the sound velocities in helium and hydrogen are about 1,000 m/s and 1,300 m/s, respectively). Thus, the occurrence of shock waves can be prevented, and the motor power, vibration and noise can be decreased.

The present inventors calculated the power loss W for various gases from the equation (1) given below. The ratio of the power losses for air and helium was found to be 1:0.22, showing a great decrease in the power loss W in the case of helium. The ratio of the power losses for air and hydrogen was 1:0.11.

$$W = l \cdot C_M \cdot 2\pi \rho r m^4 \omega^2 \qquad (1)$$

$C_M = 0.00759 R\omega^{-0.24}$ at $R\omega$ (Reynolds number)=about $10^5$ where
- l: length of rotating part (main spindle)
- $C_M$: moment coefficient
- ρ: gas density
- rm: (ri+ro)/2 (ri: radius of rotating part, ro: radius of container)
- ω: angular velocity Furthermore, helium has a higher heat coefficient than air. Thus, circulation of helium at a high velocity gives the effect of cooling the main spindle 5 whose temperature rises due to heat generation of the so-called built-in motor comprising the rotor 23 and the stator 24, in addition to conduction and radiation of the rolling frictional heat of the bearings 3a, 3b, 4.

The present inventors also calculated the quantity of heat, Qc, by heat transport of various gases from the equation (2) given below. The ratio of the quantities of heat transferred by air and helium was found to be 1:12.8, based on which a great quantity of heat transferred can be expected for helium. The ratio of the quantities of heat transferred by air and hydrogen was 1:16.5.

$$Qc = S \cdot 0.135\{(0.5Re_{WD}^2 + Re\infty^2)Pr\}^{1/3} \cdot (\lambda/D)(Ts-To) \qquad (2)$$

where
- S: surface area of rotating part (main spindle)
- $Re_{WD}$: Reynolds number of rotation
- $Re\infty$: Reynolds number of uniform flow
- Pr: Prandtl number
- λ: heat conductivity
- D: diameter of rotating part
- Ts: surface temperature of rotating part
- To: inlet temperature of container (housing)

In the present embodiment, as described earlier, air introduced from the air supply port 36 can prevent helium, which has been supplied to the gap on the outer periphery of the main spindle (within the housing 2), from leaking to the outside through the gap between the front end cap 27 and the bearing hold-down 37, and can also prevent a coolant or swarf from entering the gap on the outer periphery of the main spindle from the outside through that gap. The air introduced mixes with helium.

In the present embodiment, however, the helium separator 35 is provided in the circulation system for helium to separate and discharge surplus air, as stated earlier. Thus, a sufficient amount of helium is always circulated in the gap on the outer periphery of the main spindle (within the housing 2). Some leakage of helium can be allowed, offering the advantage that the sealing structure can be simplified.

While the present invention has been described by the foregoing embodiment, it is to be understood that the invention is not limited thereby, but may be varied in many other ways. For example, the spindle apparatus of the present invention can be applied as a spindle apparatus of a machine tool having no ATC or no built-in motor. Moreover, a hydrogen gas, lower in density and fluid pressure than air, may be circulated as the circulating gas in place of helium. However, selection of the gas requires considerations for safety, environmental compatibility, and cost. A cooling liquid may be used concomitantly for cooling of the main spindle 5 and bearings 3a, 3b, 4. Instead of air, other gas may be used as the sealing gas. Such variations are not to be regarded as a departure from the spirit and scope of the invention, and all such modifications as would be obvious to one skilled in the art are intended to be included within the scope of the appended claims.

What is claimed is:

1. A spindle apparatus of a machine tool, comprising:
   a housing;
   a main spindle rotatably supported in the housing by at least one bearing;
   means for circulating a circulating gas, lower in density and fluid pressure than air, between the housing and the main spindle such that the main spindle is rotated in an atmosphere of the circulating gas; and
   means for supplying a sealing gas to a gap between the housing and the main spindle to contain the circulating gas within the housing.

2. The spindle apparatus of claim 1, wherein the gap is formed in a vicinity of the at least one bearing to isolate an interior of the housing from an outside.

3. The spindle apparatus of claim 2, further comprising:
   a sealing gas separator for separating the sealing gas from the circulating gas and discharging the separated sealing gas, the sealing gas separator being interposed in the means for circulating the circulating gas.

4. The spindle apparatus of claim 1, wherein the circulating gas is helium.

5. The spindle apparatus of claim 1, further comprising:
   a rotor of a motor mounted on the main spindle; and
   a stator of the motor mounted on an inner peripheral portion of the housing, and wherein
   the motor for the main spindle is built into the housing.

6. The spindle apparatus of claim 1, wherein the sealing gas is air.

7. The spindle apparatus of claim 6, wherein the air is pressurized.

8. The spindle apparatus of claim 1, further comprising:
   an end cap, provided at an open end of the housing, for sealing the gap,
   wherein the sealing gas is provided through the end cap.

9. The spindle apparatus of claim 1, further comprising:
   a draw bar slidably provided inside the main spindle such that the draw bar slides along a longitudinal direction of the main spindle;
   a tool holder, provided at a first end of the main spindle, for holding a tool;
   a collet chuck that holds the tool holder with respect to the main spindle when the draw bar is in a first position and releases the tool holder with respect to the main spindle when the draw bar is in a second position.

10. The spindle apparatus of claim 9, further comprising:
    a cylinder provided at a second end of the main spindle; and
    a piston slidably provided inside the cylinder,
    wherein the piston moves the draw bar between the first position and the second position.

11. A spindle apparatus comprising:
    a hollow housing having at least one opening;
    a spindle provided inside the housing;
    a gas supply unit that supplies a first gas inside the hollow housing, the first gas having density and pressure lower than atmospheric air; and
    a sealing gas supply unit that supplies a second gas in the vicinity of the opening to at least one of seal the first gas inside the hollow housing and prevent particles from entering the hollow housing.

* * * * *